Oct. 4, 1927.
W. W. WALLACE
1,644,407
INVERTER
Filed Feb. 16, 1926    3 Sheets-Sheet 3
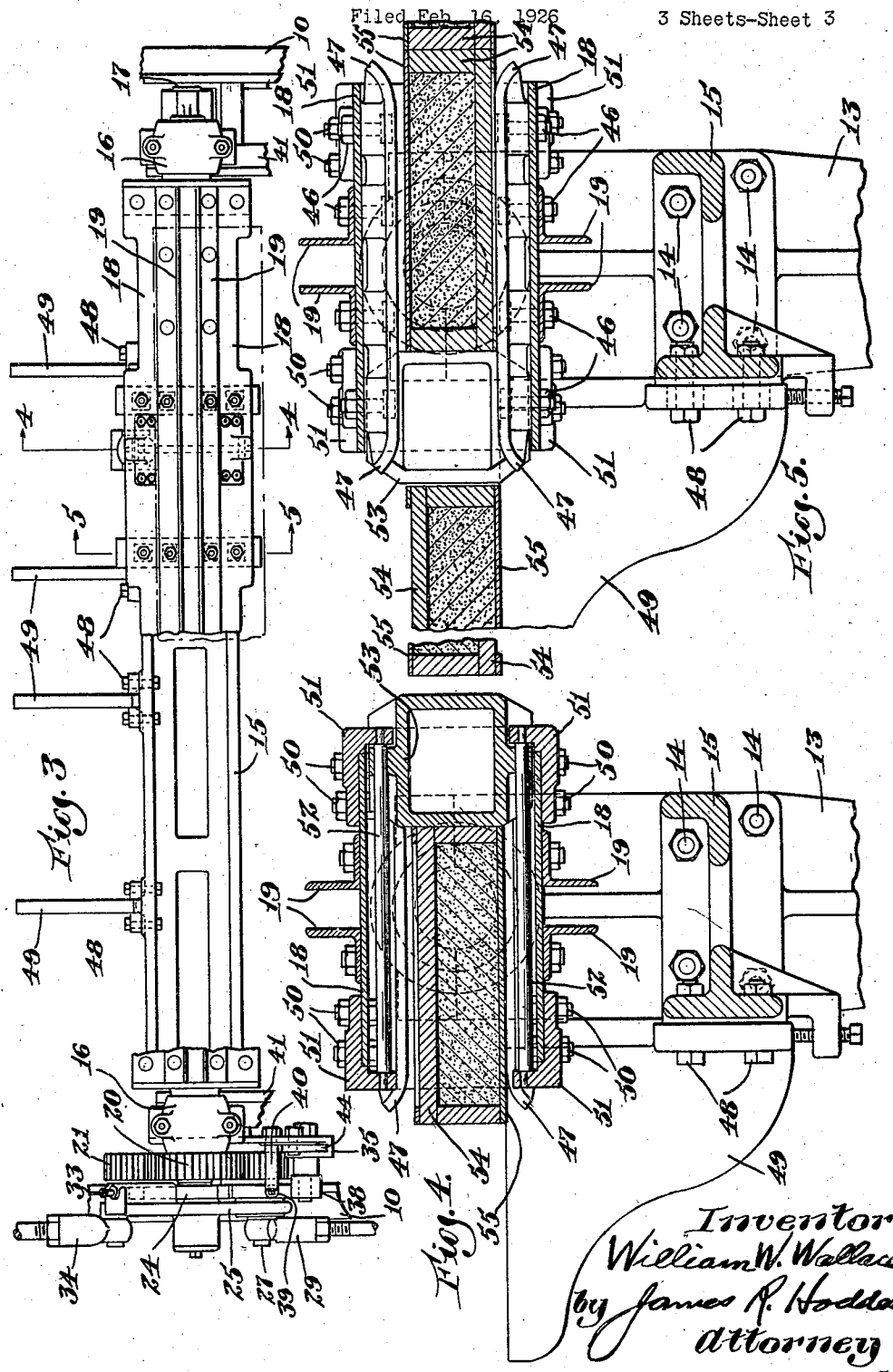
Inventor
William W. Wallace
by James P. Hodder
Attorney Patented Oct. 4, 1927.

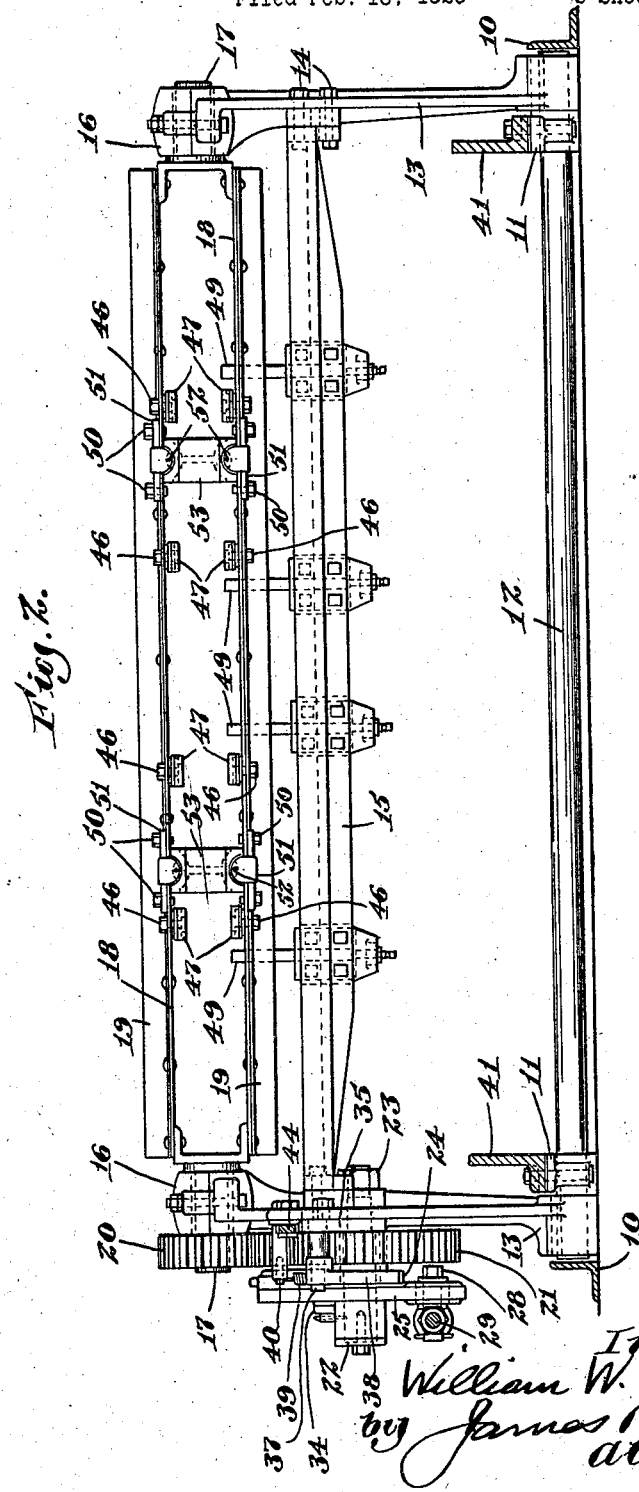

1,644,407

UNITED STATES PATENT OFFICE.

WILLIAM W. WALLACE, OF CHICAGO, ILLINOIS, ASSIGNOR TO NEW YORK BRICK HANDLING CORPORATION, OF NEW YORK, N. Y., A CORPORATION OF NEW YORK.

INVERTER.

Application filed February 16, 1926. Serial No. 88,554.

My present invention relates to brick machines, and more particularly to an improved inverter for use therein.

In the manufacture of brick with the use of molds, an important operation is the placing of a pallet on the mold and the turning of the mold over so as to bring the mold to a position on top of the pallet. After this operation is performed, the mold is removed from the pallet, leaving the green bricks in position on the pallet, which pallet and molds are then sent thru the dryer. This operation has heretofore been performed by hand, even though it has been attempted to manufacture bricks in this manner by mechanical means and the cost of such operation is exceedingly high and great strength and endurance is necessary on the part of the workman.

In my present invention I have devised an improved mechanism for receiving pallets on which are placed molds filled with green brick and which will invert the mold so as to have the same readily removed from engagement with both the pallet and the green brick associated therewith.

An improved feature of my present invention is the construction whereby the inverter carries a sliding block or blocks, which block or blocks will be engaged by the on-coming mold next to be operated on, and I am enabled thereby to give sufficient lateral travel of the mold through the inverter to positively clear the same from the inverter and this construction removes one of the most serious difficulties encountered in prior devices.

Further, in my present invention I have devised means for giving that portion of the inverter carrying the mold, an initial movement in advance of the oncoming stream of molds to allow the rotation of the mold about an axis without danger of the rotating mold interfering with or being interfered by the next succeeding mold.

In the accompanying drawings, illustrating a preferred embodiment of my invention, Fig. 1 is a side elevation;

Fig. 2 is an end elevation viewed from right to left in Fig. 1;

Fig. 3 is a plan view partly in section;

Fig. 4 is a sectional elevation on the line 4—4 of Fig. 3, and

Fig. 5 is a sectional elevation on the line 5—5 of Fig. 3.

Figure 1:
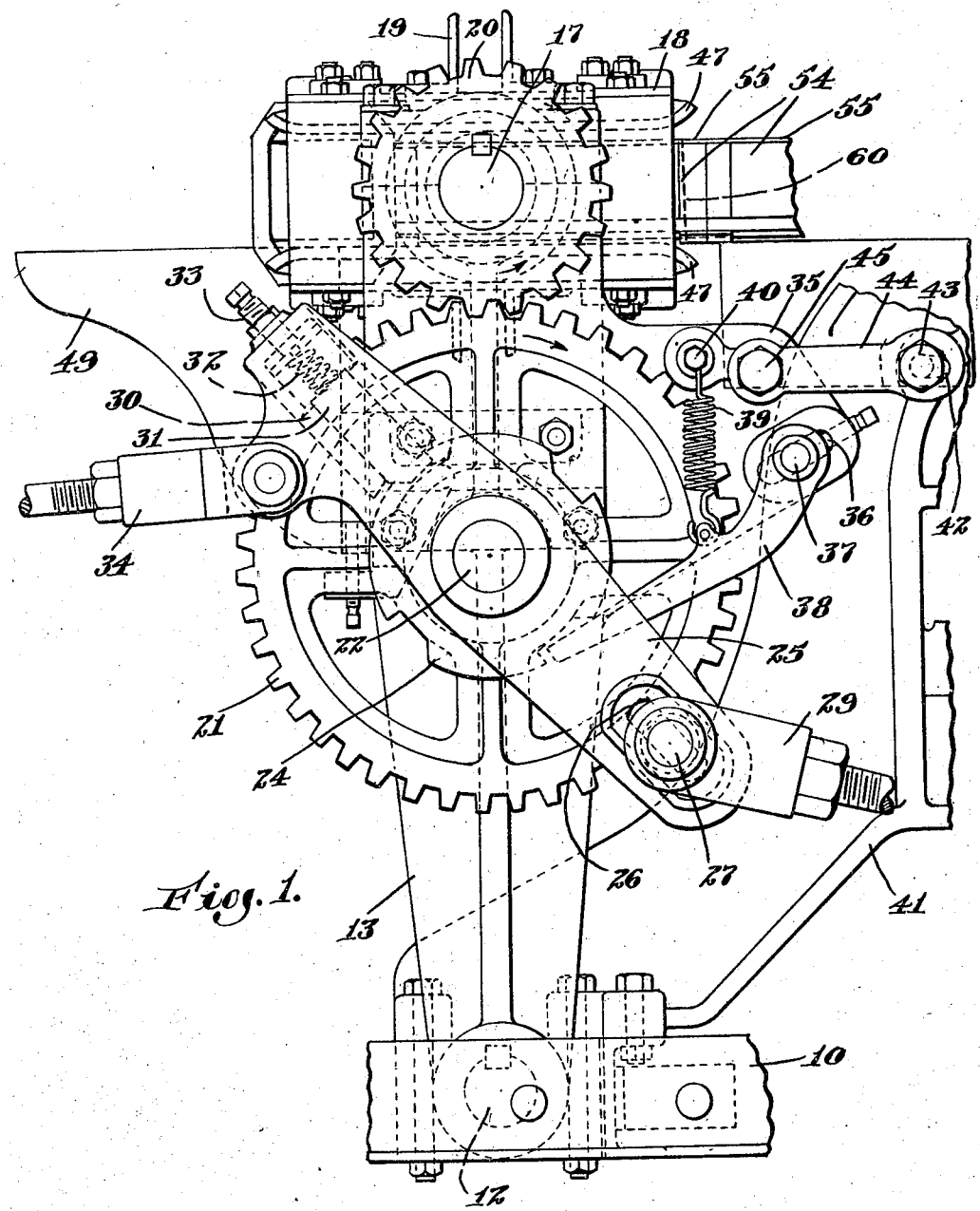

Referring to the drawings, 10 designates frame members constituting a base, these frame members being spaced apart from each other, as shown in Fig. 2, and on said base are bearings 11 in alignment with each other. In the aligned bearings is rotatably mounted a shaft 12, the ends of the shafts extending outwardly beyond the bearings 11 and secured to these outwardly extending ends are upwardly extending frame members 13. Intermediate the ends of the frame members 13 and secured thereto by bolts 14 is a brace or platform 15. Formed on the top of the members 13, are bearings 16, these bearings being in alignment with each other and adapted to receive trunnions 17, forming the end members of a rectangular frame. This rectangular frame consists of the trunnions 17, plates 18 riveted to such trunnions, together with angle irons 19 riveted to the plate 18 to stiffen the frame. To one of the trunnions 17, is secured a pinion 20 which meshes with and is driven by a gear 21. The relation of the pinion 20 and gear 21 is such that one revolution of the gear 21 causes two revolutions of the pinion 20. The gear 21 is rotatably mounted on a shaft 22 secured to one of the members 13 by nut 23. Secured to the outer face of the gear 21 is a ratchet 24. Also rotatably mounted on the shaft 22, exterior of the ratchet 24, is a double lever 25. One end—the lower end—of the lever 25 is slotted, as indicated at 26, to receive a bolt 27 that is the equivalent of a crank pin, said bolt being secured in adjusted position by a nut 28. Pivotally mounted on the bolt 27 is one end of a connecting rod 29, leading from any suitable source of power, and by means of which the lever 25 is oscillated on the shaft 22. The other end of the lever 25 has formed therein a longitudinally extending guideway 30 and in this guideway is slidably mounted a pawl 31, a spring 32 being utilized to yieldingly hold or force the pawl 31 inwardly towards the shaft 22 and therefore into engagement with the ratchet 24. A threaded screw 33 is provided for adjusting the tension of the spring 32. The teeth of the ratchet 24 and the pawl 31 are so formed that oscillation of the lever 25 in a clockwise direction, as viewed in Fig. 1, will cause the pawl 31 to engage with the teeth of the ratchet 24 and rotate said ratchet, and therefore the gear 21, to which it is attached, in a clockwise direction. While oscillation of the lever 25 in an anticlockwise direction will allow the pawl 31 to ride out of the teeth of the ratchet 24 on to the periphery thereof until it engages in and with the next succeeding teeth of said ratchet. There is, therefore, a fixed relation between the ratchet 24 and pawl 31 in one direction of oscillation of the lever 25 and a relative movement therebetween of an oscillation in an opposite direction. Also, pivotally mounted on the lever 25, adjacent to the guideway 30, is one end of a connecting rod 34, but as this connecting rod, or the function it performs, forms no part of the present invention, it will not be described in detail and will not be further referred to. The member 13 on which the gear 21 is mounted is provided with a lateral extension 35 and this lateral extension has formed therein an elongated slot 36. Adjustably mounted in the slot 36 is a bolt 37 and pivotally mounted on such bolt is a locking pawl 38, this locking pawl engaging with the teeth of the ratchet 24. Intermediate the ends of the locking pawl 38 is secured one end of a coil spring 39, the other end of this coil spring being attached at 40 to the lateral extension 35.

Secured to the frame member 10, adjacent to the structure just described, is an upwardly extending member 41, which lies substantially parallel to the member 13. This member 41 has formed therein a slot 42 of appropriate length and slidably mounted in said slot is a bolt 43 that is secured to a link 44. This link 44 is pivotally attached to the lateral extension 35 by bolt 45. By referring to Fig. 1, it will be obvious that the member 41, being fixed to the frame 10, and the members 13, being pivotally mounted on the shaft 12 to such frame, that the members 13 and all parts carried thereby will oscillate on the shaft 35 an amount determined by the length of the slot 42 in such member 41. The object of this construction will be apparent as the description of the invention progresses.

Secured to the plates 18 by bolts 46, at intervals along the length of such plates, are guide plates 47, the ends of such guide plates being flared and extending outwardly beyond the limits of the plates 18, as clearly shown in Figs. 4 and 5. Secured to the bar or platform 15 by bolts 48, are plates 49, the upper edges of which lie in the same horizontal plane as lies the upper edge of the lowermost positioned group of guides 47, as clearly shown in Figs. 1 and 4. These plates 49 act as a supporting platform for brick molds that may have been ejected from the rectangular frame of which the trunnions 17 form a part. Spaced along the length of the plates 18 and secured thereto by bolts 50, are blocks 51. These blocks 51 are arranged in pairs and secured to each pair and extending therebetween parallel to the plates 18 are rods 52. The pairs of members 51 are likewise arranged in pairs, one member of each pair being on each of the plates 18 so as to have the rods 52 associated therewith opposite and parallel to each other, said rods acting as guideways for a block 53. The block 53 is movable to either limit of the width of the rectangular frame, including the plates 18 or from the position shown in Fig. 4 to the position shown in Fig. 5. When in the position shown in Fig. 4, the outermost portion of the block 53 lies well without the limits of the rectangular frame, as defined by the members 51 and when the block 53 is in the position shown in Fig. 5, the outer face of such block is well without the limits of the rectangular frame but on the other side thereof.

The upper edges of the frame members 41 constitute a guideway on which may be placed for sliding movement thereof, the brick molds 54. These brick molds 54, as they are sliding along the top of the frame members 41, have placed thereon pallets 55 and the purpose of the present invention is to invert the molds 54 so as to bring the open end of such molds downward with the pallet on the bottom so as to enable one to lift off the mold from the newly formed brick, leaving such newly formed brick on the top surface of the pallet 55. As the molds 54, filled with the newly formed brick, move over the frame members 41 in a continuous stream, the onward movement of the stream of molds being caused by the placing in line at the rear end of the stream of a newly loaded mold from the brick machine, it is necessary to cause a preliminary separation between the mold within the limits of the rectangular frame and the next succeeding mold in order that the rotated movement of the rectangular frame on the trunnion 17 may be successfully accomplished without the brick mold therein interfering with the next succeeding mold. The connecting rod 29 in its movement to the right, as shown in Fig. 1, to cause an anticlockwise rotation of the lever 25 on the shaft 22, exerts a turning pull on the frame member 13 about the shaft 12 so as to bring the rectangular frame, including the plates 18, into the extreme right-hand position, as indicated in Fig. 1, or until the bolt 43 engages with the extreme left-hand end of the elongated slot 42 in the links 44. This position of the rectangular frame is maintained against any pressure exerted by the oncoming speed of molds 54. When in a normal position the blocks 53 occupy the position shown in Fig. 4 so that as the first filled mold 54 or the next succeeding mold 54 is moved onward in the stream of molds, the left-hand end of such mold will engage with the outer face of the block 53, this condition being present in the referred to Fig. 4. At this time there may or may not be a mold 54 in the inverted position, as shown in Fig. 4. It is assumed that there is not. Therefore, the mold 54 shown to the right of the block 53 in Fig. 4 will engage with said block 53 and move same to the left as shown in Fig. 4 until such block reaches the position shown in Fig. 5 and at the right of such block 53 is shown a mold 54 in position and the next succeeding mold 54 in engagement with the right-hand end thereof. At this particular instant, the connecting rod 29 starts on its forward movement or movement to the left, as shown in Fig. 1. The pressure exerted by such connecting rod will first cause a turning movement of the frame members 13 on the shaft 12 and the parts carried by such frame members and will move the frame members 13 to the left as shown in Fig. 1, until the right-hand end of the slot 42 in the link 44 engages with the bolt 43 and the right-hand end of the mold 54 within the rectangular frame is in the position indicated in the dotted line designated by the numeral 60 in Fig. 1. Continued movement to the left of the connecting rod 29 will cause a rotation of the lever 25 on the shaft 22 and the pawl 31 engaging with the ratchet 24 will cause a rotary movement of the gear 21 in the direction of the arrow shown and thru a quarter of a revolution. The diameter of the gear 21 being twice that of the pinion 20, the rotation of the gear 21 thru a quarter of a revolution, will cause a corresponding rotation of the pinion 20 thru a half revolution but in the opposite direction therefrom, as indicated by the arrow marked thereon. The rectangular frame, of which the trunnions 17 form a part, will, therefore, be rotated from the positions shown in Figs. 1 and 5 into the position shown in Fig. 4 where it will be observed that the mold 54 is now positioned with its open end down and with the newly made brick therein resting on the pallet 55. At this time, also, the right-hand end of the block 53 is shown separated from the next mold 54 in the oncoming stream of molds. When the connecting rod 29 moves to the left, the gap between the right-hand end of the block 53 and the next mold 54 will be closed up and when movement is given to the oncoming stream of bricks 54, it is obvious that the mold 54 in the inverted position, as shown in Fig. 4, will be moved completely out of the rectangular frame and onto the supports 49, as indicated to the left of Fig. 5. From the position indicated in Fig. 5, the left-hand mold will be lifted off the supports 49 to devices for removing the mold 54 from the newly formed brick, thereby leaving such newly formed brick on the pallets 55. The sequence of operation above described may be continued indefinitely.

While I have necessarily shown the improved embodiment of my invention somewhat in detail, it is to be understood that I may vary the size, shape and arrangement of parts comprising the device within reasonably wide limits without departing from the spirit of the invention.

Having thus described my invention, what I claim as new is:

1. In an improved inverter for brick molds and the like, the combination of a rectangular frame, means for pivotally mounting said frame, means for feeding a single brick mold into said frame and means to rotate said frame thru a half revolution to invert said brick mold, and means associated with the frame and movable diametrically with respect to the pivotal mounting of such frame for moving the inverted mold beyond the limits of the frame.

2. In an improved inverter for brick molds and the like, the combination of a rectangular frame, means for pivotally mounting said frame on a horizontal axis, means for mounting said frame for oscillation on an axis parallel to said horizontal axis, means for feeding brick molds into said frame, means to oscillate said frame and to subsequently rotate said frame thru a half revolution to invert said molds.

3. In an improved inverter for brick molds, the combination of a rectangular frame, means for pivotally mounting said frame on a horizontal axis, means for mounting said frame on an axis parallel to said first said axis, means for oscillating said frame thru a predetermined amount and subsequently rotating the rectangular frame thru a half revolution and means associated with said rectangular frame for moving a mold carried thereby beyond the limits of the rectangular frame.

4. In an improved inverter for brick molds and the like, comprising a rectangular frame open at each end, sliding blocks carried within the limits of said frame and slidable from one end to the other thereof, said blocks being so constructed and arranged as to force a mold within the frame to a point beyond the limits of said frame.

5. In an improved inverter for brick molds and the like, the combination of a rectangular frame, having a single elongated slot extending therethrough for the reception of a brick mold, means for pivotally mounting said frame on an axis passing substantially through its center of gravity, means for feeding a brick mold into the slot in said frame and means to rotate said frame through a half revolution to invert the brick molds.

6. In an improved inverter for brick molds and the like, the combination of a rectangular frame, means for pivotally mounting said frame on a horizontal axis passing substantially through the center of gravity of the frame, means for mounting said frame on an axis parallel to said horizontal axis, means for feeding brick molds into said frame and means to oscillate said frame and to subsequently rotate said frame through a half revolution to invert the mold therein.

7. In an improved inverter for brick molds and the like, comprising a rectangular frame open at each end, sliding blocks carried within the limits of said frame and slidable from one end to the other thereof, said blocks being so constructed and arranged with respect to said frame as to allow a mold to be positioned within the frame and rotated on a horizontal axis passing substantially through the center of gravity of the mold and to force the mold from the frame to a point beyond the limits of said frame.

8. In an improved inverter for brick molds and the like, the combination with a rectangular frame open at each end, pivotal mountings for said frame at either end thereof and lying substantially in the longitudinal axis of the open portion thereof, and means for feeding a plurality of brick molds in succession into said frame and means for rotating said frame through a half revolution of the feeding of the brick mold therein to invert the brick molds.

In testimony whereof, I have signed my name to this specification.

WILLIAM W. WALLACE.